United States Patent
Serres

(10) Patent No.: US 8,352,152 B2
(45) Date of Patent: Jan. 8, 2013

(54) SYSTEM, METHOD, APPARATUS AND COMPUTER PROGRAM PRODUCT FOR PROVIDING IMPROVED ENGINE CONTROL

(75) Inventor: Nicolas Serres, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 857 days.

(21) Appl. No.: 12/368,467

(22) Filed: Feb. 10, 2009

(65) Prior Publication Data

US 2010/0204899 A1    Aug. 12, 2010

(51) Int. Cl.
  *F02D 43/04*    (2006.01)
(52) U.S. Cl. .................. 701/103; 701/110; 123/330
(58) Field of Classification Search .......... 701/100–105, 701/107, 110–115; 123/350, 370, 396, 399, 123/330–335, 344–348, 376, 377, 403, 198 D, 123/198 DB, 198 DC; 702/182, 183, 187; 60/605.1; 415/27
See application file for complete search history.

(56) References Cited

U.S. PATENT DOCUMENTS

| | | | | |
|---|---|---|---|---|
| 2,937,497 A * | 5/1960 | Clark | | 60/792 |
| 3,267,669 A * | 8/1966 | Tissier | | 60/39.281 |
| 4,040,250 A * | 8/1977 | Saunders et al. | | 60/39.281 |
| 4,507,915 A * | 4/1985 | Evans | | 60/39.281 |
| 4,545,198 A * | 10/1985 | Yoshida | | 60/39.25 |
| 4,809,154 A * | 2/1989 | Newton | | 700/28 |
| 5,133,646 A * | 7/1992 | Nelson, Sr. | | 417/307 |
| 5,363,652 A * | 11/1994 | Tanaka et al. | | 60/603 |
| 6,298,718 B1 * | 10/2001 | Wang | | 73/114.01 |
| 6,438,484 B1 * | 8/2002 | Andrew et al. | | 701/100 |
| 6,725,660 B2 * | 4/2004 | Hidaka | | 60/602 |
| 6,823,254 B2 * | 11/2004 | Faymon et al. | | 701/100 |
| 2004/0118117 A1 * | 6/2004 | Hartman et al. | | 60/602 |
| 2008/0034753 A1 * | 2/2008 | Furman et al. | | 60/605.1 |

* cited by examiner

*Primary Examiner* — John T. Kwon
*Assistant Examiner* — Johnny Hoang
(74) *Attorney, Agent, or Firm* — Alston & Bird LLP

(57) ABSTRACT

An apparatus for providing an antisurge operating mode for a turbocharged engine may include a processor. The processor may be configured to receive indications of engine operating parameters and engine accelerator pedal position, determine whether the received indications correspond to antisurge mode activation conditions, and, in response to a determination that the received indications correspond to antisurge mode activation conditions, initiate control of selected engine components by directing the selected engine components to operate based on stored engine operating parameters recorded a predetermined time prior to the determination.

20 Claims, 7 Drawing Sheets

SYSTEM, METHOD, APPARATUS AND COMPUTER PROGRAM PRODUCT FOR PROVIDING IMPROVED ENGINE CONTROL

TECHNOLOGICAL FIELD

Embodiments of the present invention relate generally to engine control technology and, more particularly, relate to apparatuses, methods and computer program products for providing for providing improved engine control.

BACKGROUND

Gasoline engines have been a dominant mode of providing propulsion for numerous types of vehicles for many years. As such, innovations aimed at improving gasoline engine performance in areas such as power and efficiency have continued to be desirable goals. A turbocharger is one example of an innovation that has improved gasoline engine performance. The turbocharger, which is sometimes referred to simply as a turbo, may be thought of as a gas compressor used to increase the mass of air entering the engine to create more engine power. As such, the turbocharger may provide forced-induction of an internal combustion engine. The turbocharger is typically driven off the engine's own exhaust gases.

On gasoline turbocharged engines, a potential problem of compressor surge exists in situations where the throttle is closed. Such situations may be particularly noticeable when the throttle is closed from an initially substantially open position. In this regard, when the throttle is closed compressed air will flow to the throttle valve, but will have no exit due to the closure of the throttle valve. The compressed air may then decompress back across the turbocharger (causing the "surge"), which may be the only path the now blocked air can take. The surge can raise the pressure of the air to a level that can cause engine damage or undesirable noise due to turbulence.

In order to prevent or at least reduce the impact of compressor surge, turbocharged engines typically include a device such as a recirculation valve. The device operates to provide a valve for permitting air between the turbocharger and the throttle valve with a flow path when the throttle valve is closed, which vents off the excess air pressure, to maintain the turbo spinning at a high speed. The air is usually recycled back into the turbocharger inlet when using a recirculation valve, but can also be vented to the atmosphere when using a blowoff valve. By providing an escape air path, engine damage and noise may be avoided as well as reduction of the phenomenon of turbo lag due to slowing down of the turbo that may take place as a result of a surge.

Although the recirculation valve or blowoff valve may be effective at preventing surge conditions, the recirculation valve otherwise does not typically provide improvement in engine power or efficiency, but still adds to cost and complexity of the engine. Accordingly, it may be desirable to provide a mechanism for avoiding use of the recirculation valve.

BRIEF SUMMARY OF EXEMPLARY EMBODIMENTS

A system, method, apparatus and computer program product are therefore provided that may enable replacement of the recirculation valve with a strategy for providing engine control that may accomplish the benefits of the recirculation valve without the use of the recirculation valve. In some instances, the strategy may be implemented by modification of an engine control unit of the engine. The modification may include a software module that enables control of certain engine parameters under specified conditions related to surge prevention. Accordingly, an exemplary embodiment of the present invention may enable the use of a software module to reduce the complexity of compressor housing design or engine inlet pipe systems, reduce the overall boosting function cost, and allow designers to transfer cost to more valuable functions of the turbocharger.

In one exemplary embodiment, a method of providing an antisurge operating mode for a turbocharged engine is provided. The method may include receiving indications of engine operating parameters and engine accelerator pedal position, determining whether the received indications correspond to antisurge mode activation conditions, and, in response to a determination that the received indications correspond to antisurge mode activation conditions, initiating control of selected engine components by directing the selected engine components to operate based on stored engine operating parameters recorded a predetermined time prior to the determination.

In another exemplary embodiment, a computer program product for providing an antisurge operating mode for a turbocharged engine is provided. The computer program product may include at least one computer-readable storage medium having computer-executable program code instructions stored therein. The computer-readable program code instructions may include program code instructions for receiving indications of engine operating parameters and engine accelerator pedal position, determining whether the received indications correspond to antisurge mode activation conditions, and, in response to a determination that the received indications correspond to antisurge mode activation conditions, initiating control of selected engine components by directing the selected engine components to operate based on stored engine operating parameters recorded a predetermined time prior to the determination.

In another exemplary embodiment, an apparatus for providing an antisurge operating mode for a turbocharged engine is provided. The apparatus may include a processor that may be configured to receive indications of engine operating parameters and engine accelerator pedal position, determine whether the received indications correspond to antisurge mode activation conditions, and, in response to a determination that the received indications correspond to antisurge mode activation conditions, initiate control of selected engine components by directing the selected engine components to operate based on stored engine operating parameters recorded a predetermined time prior to the determination.

In another exemplary embodiment, a system for providing an antisurge operating mode for a turbocharged engine is provided. The system may include an engine and a turbocharger and an engine control unit. The turbocharger may be in operable communication with the engine. The engine control unit may be configured to control at least one actuator associated with the engine. The engine control unit may also include a processor that may be configured to receive indications of engine operating parameters and engine accelerator pedal position, determine whether the received indications correspond to antisurge mode activation conditions, and, in response to a determination that the received indications correspond to antisurge mode activation conditions, initiate control of selected engine components by directing the selected engine components to operate based on stored engine operating parameters recorded a predetermined time prior to the determination.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
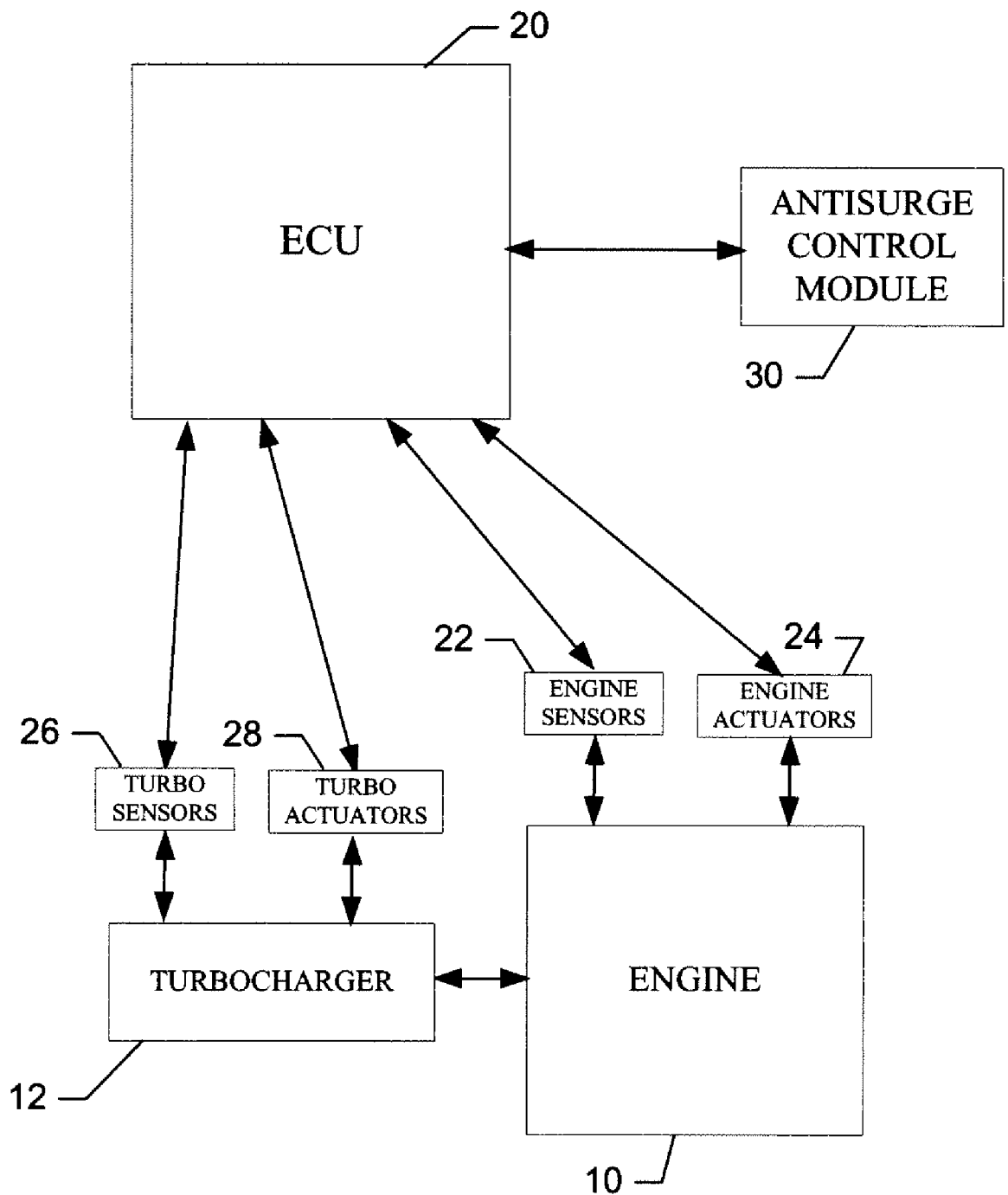
FIG. 1 is a schematic block diagram of a system according to an exemplary embodiment of the present invention.

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the term "exemplary" is not provided to convey any qualitative assessment, but instead merely to convey an illustration of an example.

Referring now to FIG. 1, a schematic block diagram showing certain elements of a system including an engine control unit according to an exemplary embodiment of the present invention is provided. However, FIG. 1 is illustrative of one exemplary embodiment, and it should be understood that other architectures including additional or even fewer elements may also be employed in connection with practicing embodiments of the present invention. The system includes an engine 10, which may be a gasoline engine. The engine 10 may be in operable communication with a turbocharger 12.

The system may also include an engine control unit (ECU) 20. The ECU 20 is an electronic control unit that may include hardware and/or software components configured to control various aspects of engine operation. In particular, the ECU 20 may receive inputs from various engine sensors 22 and control various engine actuators 24. The engine sensors 22 may be disposed at various points in the engine 10 to measure or otherwise determine corresponding engine parameters. Examples of engine sensors 22 may include a throttle position sensor, air temperature sensor, engine revolutions per minute (RPM) sensor, engine load sensor, accelerator pedal position sensor and/or others. The engine actuators 24 may include various relays, solenoids, ignition coils, or other electrically operable devices that may be used to control corresponding engine parameters.

In an exemplary embodiment, the ECU 20 may also be in communication with other sensors and actuators associated with a vehicle in which the engine 10 is disposed. In some cases, the ECU 20 may be in communication with one or more turbo sensors 26 (e.g., turbocharger wastegate position) and/or one or more turbo actuators 28 (e.g., turbocharger wastegate setposition). As such, the ECU 20 may receive information on engine parameters from any of the sensors with which the ECU 20 has communication and provide control inputs to any of the actuators with which the ECU 20 has communication.

In an exemplary embodiment, the ECU 20 may further include an antisurge control module 30. The antisurge control module 30 may be any means such as a device or circuitry embodied in hardware, software or a combination of hardware and software that is configured to perform the corresponding functions of the antisurge control module 30 as described herein. In some embodiments, the antisurge control module 30 may be configured to augment ECU 20 capabilities with respect to surge prevention by identifying engine conditions under which action is to be taken for antisurge activity and with respect to taking or directing actions (e.g., via control of various engine actuators 24 and/or turbo actuators 28) with respect to antisurge activity. As such, in an exemplary embodiment, the antisurge control module 30 may merely provide additional functionality to the ECU 20. However, in some embodiments, the antisurge control module 30 may directly provide such functionality itself. As such, as an alternative to the exemplary embodiment of FIG. 1 in which the ECU 20 controls the engine actuators 24 and/or turbo actuators 28 and receives information from the engine sensors 22 and/or turbo sensors 26, the antisurge control module 30 may have direct communication with some or all of the engine actuators 24 and/or turbo actuators 28 and the engine sensors 22 and/or turbo sensors 26 in some cases.

Accordingly, embodiments of the present invention may employ the antisurge control module 30 to prevent or at least reduce the impact of surge in response to throttle closing after substantially open throttle operation. Furthermore, the use of the antisurge control module 30 may enable the engine 10 to be produced without a recirculation valve or other diversion device aimed at limiting or preventing surge.

Figure 2:
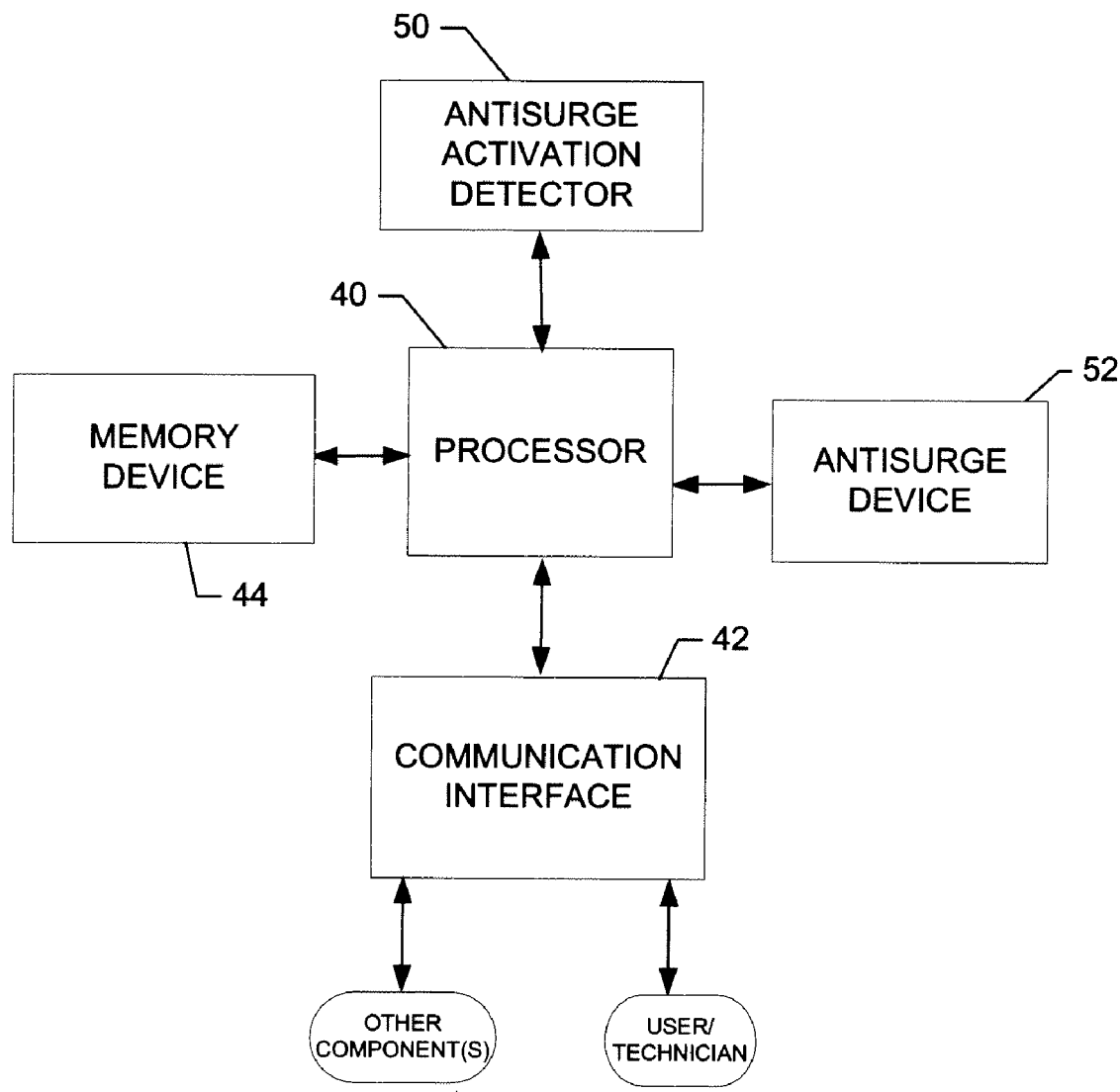
FIG. 2 illustrates a block diagram showing an apparatus for providing an antisurge operating mode for a turbocharged engine according to an exemplary embodiment of the present invention.

FIG. 2 shows a block diagram view of one example of an apparatus configured to perform exemplary embodiments of the present invention. However, it should be noted that an apparatus for enabling engine control for anti-surge operation (e.g., in the absence of a recirculation or air diversion valve for such purpose) need not include all of the devices shown in FIG. 2 and could, in some cases, include more or different modules. Moreover, the apparatus may be embodied entirely at a single device (e.g., the antisurge control module 30) or may be embodied at a combination of devices (e.g., in some cases, some of the components shown in FIG. 2 may be portions of the ECU 20, while others are portions of the antisurge control module 30). As such, the embodiment of FIG. 2 is merely provided to be exemplary of some possible embodiments that may employ the present invention.

In an exemplary embodiment, the apparatus may include or otherwise be in communication with a processor 40, a communication interface 42 and a memory device 44. The memory device 44 may include, for example, volatile and/or non-volatile memory. The memory device 44 may be configured to store information, data, applications, modules, instructions or the like for enabling the apparatus to carry out various functions in accordance with exemplary embodiments of the present invention. For example, the memory device 44 could be configured to buffer input data for processing by the processor 40. Additionally or alternatively, the memory device 44 could be configured to store instructions corresponding to an application for execution by the processor 40.

The processor 40 may be a processor of the ECU 20 or a co-processor or processor of the antisurge control module 30. The processor 40 may be embodied in a number of different ways. For example, the processor 40 may be embodied as a processing element, a coprocessor, a controller or various other processing means or devices including integrated circuits such as, for example, an ASIC (application specific integrated circuit), FPGA (field programmable gate array) a hardware accelerator or the like. In an exemplary embodiment, the processor 40 may be configured to execute instructions stored in the memory device 44 or otherwise accessible to the processor 40. As such, whether configured by hardware or software methods, or by a combination thereof, the processor 40 may represent an entity capable of performing operations according to embodiments of the present invention while configured accordingly. Thus, for example, when the processor 40 is embodied as an ASIC, FPGA or the like, the processor 40 may be specifically configured hardware for conducting the operations described herein. Alternatively, as another example, when the processor 40 is embodied as an executor of software instructions, the instructions may specifically configure the processor 40, which may otherwise be a general purpose processing element if not for the specific configuration provided by the instructions, to perform the algorithms and/or operations described herein. However, in some cases, the processor 40 may be a processor of a specific device (e.g., the ECU 20) adapted for employing embodiments of the present invention by further configuration of the processor 40 by instructions for performing the algorithms and/or operations described herein (e.g., by addition of the antisurge control module 30).

Meanwhile, the communication interface 42 may be any means such as a device or circuitry embodied in either hardware, software, or a combination of hardware and software that is configured to receive and/or transmit data from/to sensors, actuators, or other devices or modules in communication with the apparatus (e.g., the engine actuators 24 and/or turbo actuators 28 and the engine sensors 22 and/or turbo sensors 26). In this regard, the communication interface 42 may include, for example, supporting wiring, circuitry, hardware and/or software for enabling communications with various vehicle and/or engine components. In some environments, the communication interface 42 may include a communication port for receiving information from a user interface and/or a communication port for enabling diagnostic equipment to be placed into communication with the ECU 20.

In an exemplary embodiment, the processor 40 may be embodied as, include or otherwise control an antisurge activation detector 50 and an antisurge device 52. The antisurge activation detector 50 and the antisurge device 52 may each be any means such as a device or circuitry embodied in hardware, software or a combination of hardware and software that is configured to perform the corresponding functions of the antisurge activation detector 50 and the antisurge device 52, respectively. The antisurge activation detector 50 and the antisurge device 52 may, in some cases, define the antisurge control module 30 or be portions thereof along with some or all of the other components in FIG. 2. In situations where the antisurge activation detector 50 and the antisurge device 52 define the antisurge control module 30, the communication interface 42 may be a communication interface of the ECU 20 and may provide information to and receive information from the actuators, sensors and other devices of the engine 10 and/or turbocharger 12. In embodiments where the communication interface 42 is also a portion of the antisurge control module 30, the communication interface 42 may be in communication with the ECU 20 to provide information to and receive information from the actuators, sensors and other devices of the engine 10 and/or turbocharger 12, as appropriate, via the ECU 20.

The antisurge control detector 50 may be configured to detect situations in which antisurge operations are to be implemented. As such, the antisurge control detector 50 may be configured to monitor engine parameters in order to determine whether the parameters are indicative of conditions that would otherwise potentially cause a surge. In response to detection of conditions that would otherwise potentially cause the surge, the antisurge control detector 50 may be configured to activate antisurge operation by activating the antisurge device 52.

Figure 3:
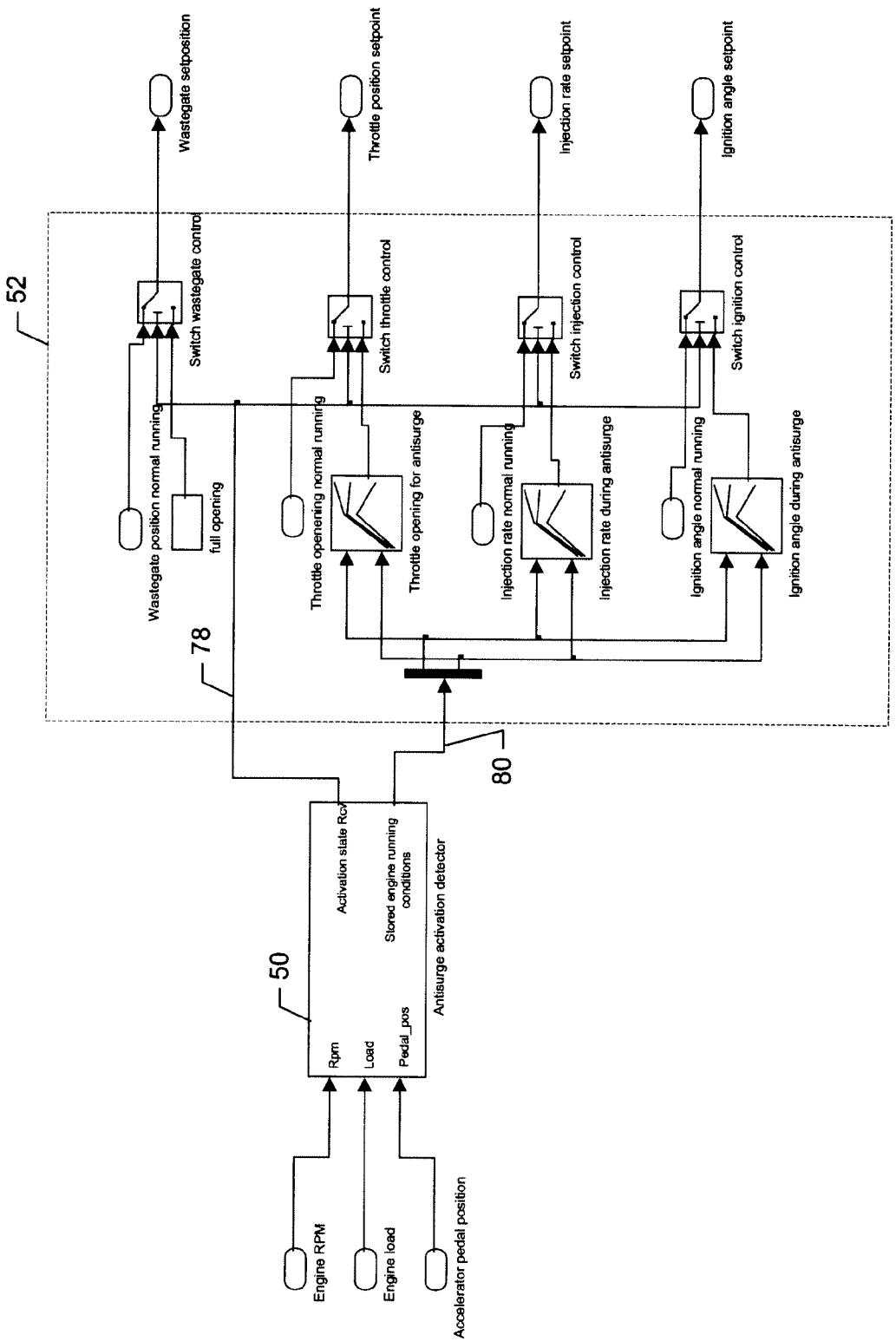
FIG. 3 illustrates a block diagram showing an antisurge activation detector and an antisurge device according to an exemplary embodiment of the present invention.

The antisurge device 52 may be configured to employ data recorded for a predetermined time period prior to the activation of antisurge operation triggered by the antisurge control detector 50 to control engine parameters for surge prevention. In an exemplary embodiment, the antisurge device 52 may provide control signals to the engine actuators 24 and/or turbo actuators 28 to switch from a normal operating condition to antisurge operation. The control of the engine actuators 24 and/or turbo actuators 28 may, for example, include control of wastegate setposition, throttle position, injection rate and/or ignition angle. FIG. 3 illustrates a more detailed example of operation of the antisurge activation detector 50 and the antisurge device 52 according to one exemplary embodiment.

As shown in FIG. 3, the antisurge activation detector 50 may, according to one example embodiment, receive inputs from engine RPM, engine load and accelerator pedal position. Based on the inputs received, the antisurge activation detector 50 may be configured to detect engine conditions relative to engine operating parameters such as current engine load, current engine RPM and current accelerator pedal position to determine whether surge activation is to be activated. If engine conditions are detected by the antisurge activation detector 50 that indicate that antisurge operations are to be activated, the antisurge activation detector 50 may provide an activation state output to the antisurge device 52 to activate a mode of operation switch from a normal operating mode to an antisurge operation mode.

The antisurge operation mode may utilize stored engine running conditions from a predetermined time period prior to detection of surge conditions to direct control of various engine parameters (e.g., ignition angle setpoint, injection rate setpoint, throttle position setpoint, and wastegate setposition). As shown in FIG. 3, the antisurge device 52 may include a plurality of switch controls (e.g., switch wastegate control 70, switch throttle control 72, switch injection control 74, and switch ignition control 76). Each of the switch controls may be operated in response to an activation state input 78 from the antisurge activation detector 50. The activation state input 78 is provided in response to detection of engine conditions indicative a need for antisurge operations to be activated. In response to provision of the activation state input 78 to the switch controls, the switch controls shift from normal engine running mode to the antisurge mode for each engine or turbo actuator controlled by the antisurge device 52. As such, according to this example, in response to receipt of the activation input, wastegate position may be modified from its normal running position to a fully open position by activation of the switch wastegate control 70, throttle position may be modified from its normal running condition to a position determined based on stored engine running conditions by activation of the switch throttle control 72, injection rate (e.g., fuel injection rate) may be modified from its normal running condition to a setposition determined based on stored engine running conditions by activation of the switch injection control 74, and ignition angle may be modified from its normal running condition to a setposition determined based on stored engine running conditions by activation of the switch ignition control 76.

As indicated above, the antisurge operation mode may utilize stored engine running conditions from a predetermined time period prior to detection of surge conditions (or initiation of antisurge operation) to direct control of various engine parameters. Thus, stored engine running condition data 80 may be provided to the antisurge device 52 by the antisurge activation detector 50 in response to detection of conditions that trigger activation of the antisurge operation. The stored engine running condition data 80 may define recorded engine operating points taken at a predetermined time (e.g., one second) prior to entering the antisurge mode of operation. Thus, the stored engine running condition data 80 may include, for example, ignition angle setpoint at the predetermined time, injection rate setpoint at the predetermined time, throttle position setpoint at the predetermined time, and wastegate setposition at the predetermined time). Such information may be determined directly, or based on engine RPM and engine load data as shown in FIG. 4.

Figure 4:
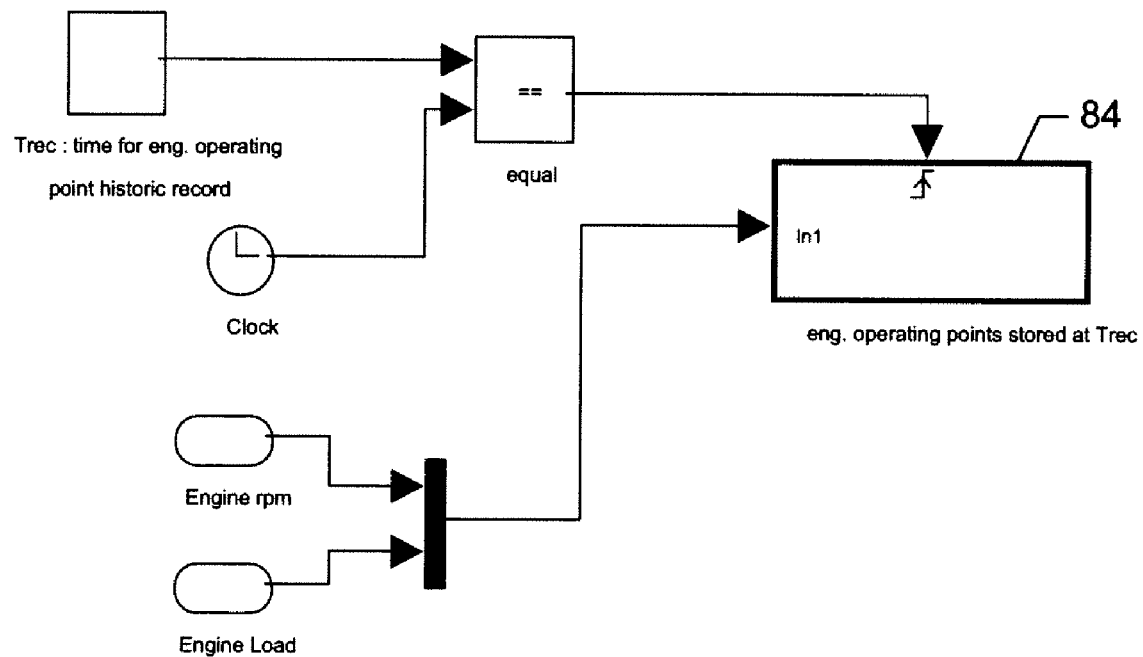
FIG. 4 illustrates a block diagram showing one example of an engine operating point storage device that may be used to record engine operating points for use as stored engine running condition data according to an exemplary embodiment of the present invention.

FIG. 4 shows one example of an engine operating point storage device 84 that may be used to record engine operating points for use as the stored engine running condition data 80. As shown in FIG. 4, the engine RPM and engine load data may be stored when recording is triggered. The recording or reporting of such data may be triggered when timing, as indicated by a clock, matches a time (e.g., the predefined time period) set for engine operating point recording relative to activation of the antisurge operation mode. Thus, in some cases, the data may be continuously recorded (e.g., in a ring buffer that deletes older data to make room for newer data) and only reported when appropriate (e.g., when antisurge prevention is needed based on detection of surge conditions by the antisurge activation detector 50).

Figure 5:
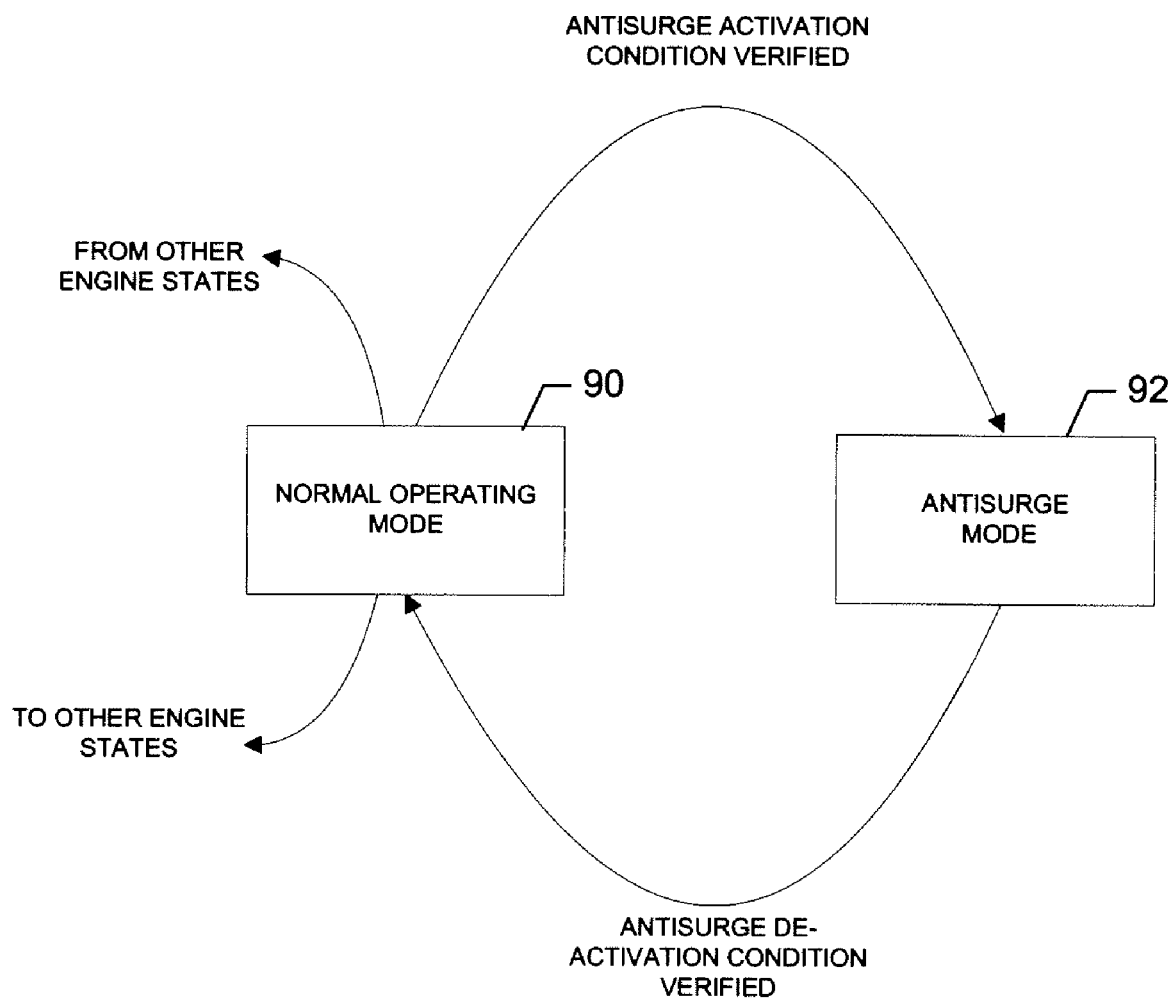
FIG. 5 illustrates a state diagram for antisurge operation according to an exemplary embodiment of the present invention.

Accordingly, based on the operation of the embodiment shown in FIGS. 3 and 4, engine operating points may be stored by the engine operating point storage device 84. In response to detection of conditions indicative of a potential surge, the antisurge activation detector 50 may provide the activation state input 78 and stored engine running condition data 80 (e.g., defining engine operating conditions at a predetermined time prior to detection of the conditions indicative of the potential surge) to the antisurge device 52. The antisurge device 52 may switch from normal operating mode 90 to antisurge mode 92 (as shown in FIG. 5) by activating switch controls that replace normal running control for various engine and turbo actuators with antisurge mode control. In this regard, the antisurge device 52 may direct that the wastegate be fully opened and that throttle position, injection rage and ignition rate be controlled based on positions utilized at the predetermined time period prior to detection of the conditions indicative of the potential surge. Thus, for example, the throttle may be kept open for a period of time with no or reduced torque in order to prevent the surge. In some cases, the actuators controlled in the antisurge mode may be held at positions determined by the antisurge device 52 for a predefined period of time or until the conditions for de-activation of the antisurge mode are met. However, it may alternatively be possible to program a decay function to slowly alter the positions of the actuators controlled from the time at which antisurge mode operation is commenced until the conditions for de-activation of the antisurge mode are met.

FIG. 5 illustrates a state diagram for antisurge operation according to an exemplary embodiment. In this regard, as shown in FIG. 5, the engine 10 may run in the normal operating mode 90 until antisurge activation conditions are verified (e.g., by the antisurge activation detector 50). During the period of operation in the normal operating mode 90, the engine 10 may transition to and from other engine operating states. However, in response to detection of antisurge activation conditions, the engine 10 may be triggered to enter into the antisurge mode 92. In response to detection of antisurge de-activation conditions, the engine 10 may be transitioned back into the normal operating mode 90.

Figure 6:
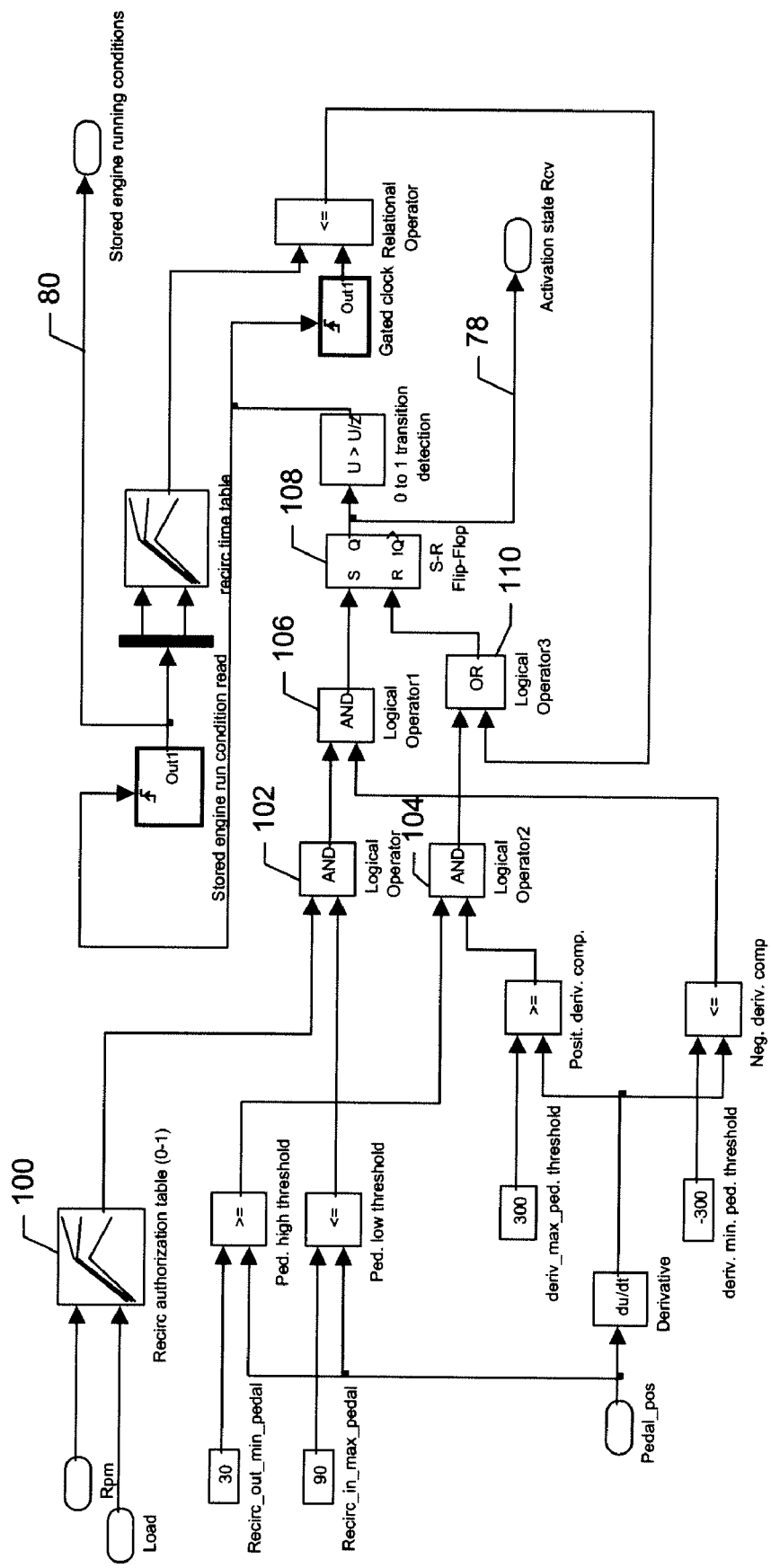
FIG. 6 illustrates an example of operation of the antisurge activation detector according to one exemplary embodiment of the present invention.

FIG. 6 illustrates an example of operation of the antisurge activation detector 50 according to one exemplary embodiment. As shown in FIG. 6, a recirc authorization table 100 may be used to map engine operating points. In the example shown, the engine operating points may be a function of engine RPM and engine load to map potential trouble points where an antisurge operating strategy should be applied. As such, the recirc authorization table 100 may define trouble points where antisurge mode is to be activated. In this example, a binary mapping of 1 values may indicate antisurge mode activation, while a binary mapping of a 0 value may indicate that normal operating mode 90 may be maintained. An indication of operating conditions (e.g., engine RPM and engine load parameters) that are mapped to antisurge mode activation (e.g., a logical 1 output from the recirc authorization table) may be fed to a logical operator 102 that may produce a high output when pedal position data indicates that pedal position is below a threshold value (e.g., the pedal has been substantially released). A high output of the logical operator 102, coupled with an indication that pedal position has experienced a change from a high to low position above a particular threshold may provide a high output from logical operator 106 to set flip-flop 108 to indicate activation of the antisurge mode by providing the activation state input 78. The setting of flip-flop 108 may also trigger detection of a transition that may signal for stored engine running condition data 80 to be read out to the antisurge device 52.

Meanwhile, logical operator 104 may detect a condition in which pedal position is high after being altered by a threshold amount. If the logical operator 104 outputs a logical 1 value or the stored engine running condition data 80 has been read out for a particular period of time, logical operator 110 may reset flip-flop 108 to provide indication of a detection of an antisurge de-activation condition by clearing the activation state input 78 to switch the switch controls of the antisurge device 52 back to normal operation. Although FIG. 6 shows one example implementation of the antisurge activation detector 50, it should be appreciated that other architectures with different combinations of components could also be used.

Figure 7:
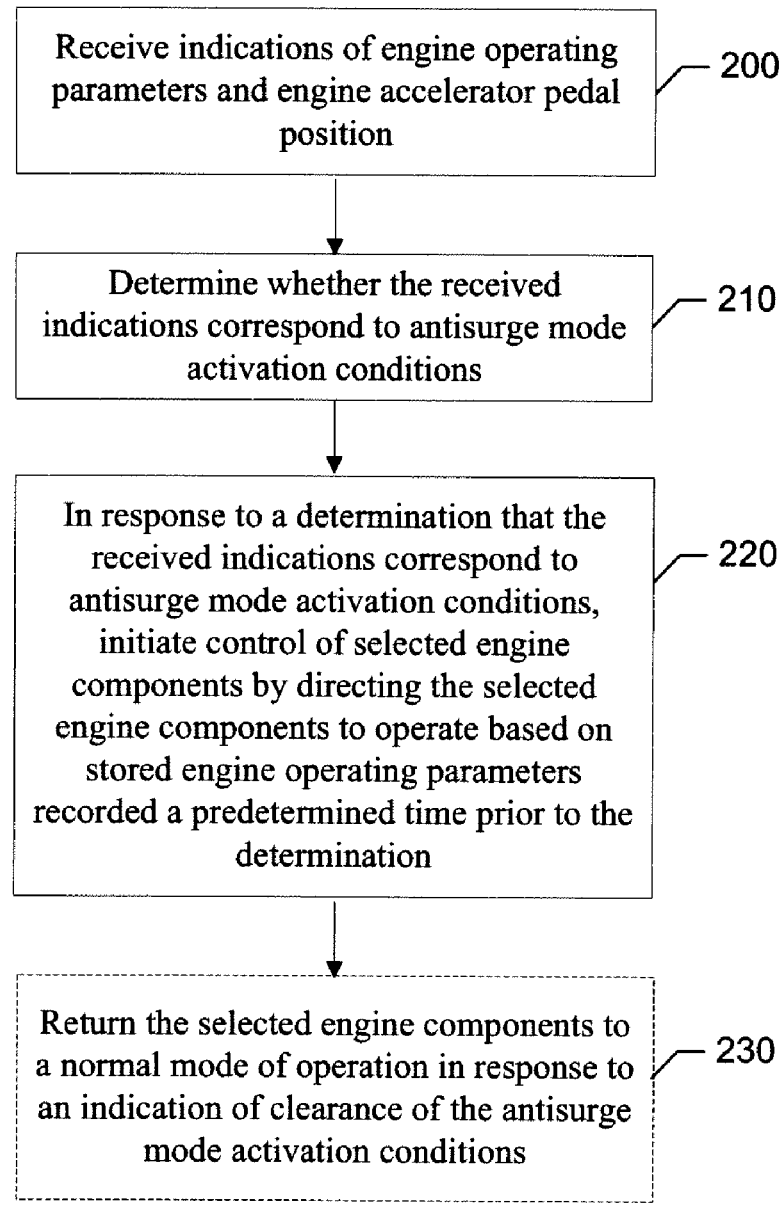
FIG. 7 is a flowchart according to a method of providing an antisurge operating mode for a turbocharged engine according to an exemplary embodiment of the present invention.

FIG. 7 is a flowchart of a system, method and program product according to exemplary embodiments of the invention. It will be understood that each block or step of the flowchart, and combinations of blocks in the flowchart, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device (e.g., memory device 46) and executed by a processor (e.g., processor 40). As will be appreciated, any such computer program instructions may be loaded onto a computer or other programmable apparatus (i.e., hardware) to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that one or more blocks or steps of the flowchart, and combinations of blocks or steps in the flowchart, can be implemented by special purpose hardware-based computer systems which perform the specified functions or steps, or combinations of special purpose hardware and computer instructions.

In this regard, one embodiment of a method for providing an antisurge operating mode for a turbocharged engine as provided in FIG. 7 may include receiving indications of engine operating parameters and engine accelerator pedal position at operation 200 and determining whether the received indications correspond to antisurge mode activation conditions at operation 210. In response to a determination that the received indications correspond to antisurge mode activation conditions, the method may further include initiating control of selected engine components by directing the selected engine components to operate based on stored engine operating parameters recorded a predetermined time prior to the determination at operation 220.

In some exemplary embodiments, further optional operations may be included, an example of which is shown in dashed lines in FIG. 7. In this regard, the method may further include returning the selected engine components to a normal mode of operation in response to an indication of clearance of the antisurge mode activation conditions at operation 230. Additionally, some of the operations described above may be modified in certain embodiments. In this regard, for example, initiating control of selected engine components may include controlling a throttle position setpoint, an injection rate setpoint, an ignition angle setpoint and wastegate setposition. In some embodiments, determining whether the received indications correspond to antisurge mode activation conditions may be performed based on a mapping of engine trouble operating points relative to engine load and engine revolutions per minute (RPM) and/or based on a change in engine accelerator pedal position from a position corresponding to a substantially open throttle position to a substantially closed throttle position.

In an exemplary embodiment, an apparatus for performing the method above may include a processor (e.g., the processor 40) configured to perform each of the operations (200-230) described above. The processor may, for example, be configured to perform the operations by executing stored instructions or an algorithm for performing each of the operations. Alternatively, the apparatus may include means for performing each of the operations described above. In this regard, according to an exemplary embodiment, examples of means for performing operations 200 to 230 may include, for example, the antisurge activation detector 50, the antisurge device 52, or the processor 40.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising a processor configured to:
receive indications of engine operating parameters and engine accelerator pedal position of a turbocharged gasoline engine;
continually record engine operating parameters during engine operation and store the engine operating parameters in an engine operating point storage device;
determine whether the received indications correspond to antisurge mode activation conditions; and
in response to a determination that the received indications correspond to antisurge mode activation conditions, initiate control of selected engine components by directing the selected engine components to operate based on the stored engine operating parameters recorded a predetermined time prior to the determination.

2. The apparatus of claim 1, wherein the processor is configured to determine whether the received indications correspond to antisurge mode activation conditions based on a mapping of engine trouble operating points relative to engine load and engine revolutions per minute (RPM).

3. The apparatus of claim 1, wherein the processor is configured to determine whether the received indications correspond to antisurge mode activation conditions based on a change in engine accelerator pedal position from a position corresponding to a substantially open throttle position to a substantially closed throttle position.

4. The apparatus of claim 1, wherein the processor is configured to initiate control of selected engine components by controlling a throttle position setpoint, an injection rate setpoint, an ignition angle setpoint and wastegate setposition.

5. The apparatus of claim 1, wherein the processor is further configured to return the selected engine components to a normal mode of operation in response to an indication of clearance of the antisurge mode activation conditions.

6. The apparatus of claim 1, wherein the processor is configured to initiate control of selected engine components by activating a switching control to shift from a normal operating mode to an antisurge mode.

7. A system comprising:
a gasoline engine;

a turbocharger in operable communication with the engine; and an engine control unit configured to control at least some actuators associated with the engine and the turbocharger, wherein the engine control unit includes a processor configured to:

continually record engine operating parameters during engine operation and store the engine operating parameters in an engine operating point storage device;

receive indications of engine operating parameters and engine accelerator pedal position;

determine whether the received indications correspond to antisurge mode activation conditions; and in response to a determination that the received indications correspond to antisurge mode activation conditions, initiate control of selected engine components by directing the selected engine components to operate based on the stored engine operating parameters recorded a predetermined time prior to the determination.

8. The system of claim 7, wherein the processor is configured to determine whether the received indications correspond to antisurge mode activation conditions based on a mapping of engine trouble operating points relative to engine load and engine revolutions per minute (RPM).

9. The system of claim 7, wherein the processor is configured to determine whether the received indications correspond to antisurge mode activation conditions based on a change in engine accelerator pedal position from a position corresponding to a substantially open throttle position to a substantially closed throttle position.

10. The system of claim 7, wherein the turbocharger does not include a recirculation device for surge prevention.

11. A method comprising:

receiving indications of engine operating parameters and engine accelerator pedal position of a turbocharged gasoline engine;

continually recording engine operating parameters during engine operation and storing the engine operating parameters in an engine operating point storage device;

determining whether the received indications correspond to antisurge mode activation conditions; and in response to a determination that the received indications correspond to antisurge mode activation conditions, initiating control of selected engine components by directing the selected engine components to operate based on the stored engine operating parameters recorded a predetermined time prior to the determination.

12. The method of claim 11, wherein determining whether the received indications correspond to antisurge mode activation conditions is performed based on a mapping of engine trouble operating points relative to engine load and engine revolutions per minute (RPM).

13. The method of claim 11, wherein determining whether the received indications correspond to antisurge mode activation conditions is performed based on a change in engine accelerator pedal position from a position corresponding to a substantially open throttle position to a substantially closed throttle position.

14. The method of claim 11, wherein initiating control of selected engine components comprises controlling a throttle position setpoint, an injection rate setpoint, an ignition angle setpoint and wastegate setposition.

15. The method of claim 11, further comprising returning the selected engine components to a normal mode of operation in response to an indication of clearance of the antisurge mode activation conditions.

16. A computer program product comprising at least one computer-readable storage medium having computer-executable program code instructions stored therein, the computer-executable program code instructions comprising:

program code instructions for receiving indications of engine operating parameters and engine accelerator pedal position of a turbocharged gasoline engine;

program code instructions for continually recording engine operating parameters during engine operation and storing the engine operating parameters in an engine operating point storage device;

program code instructions for determining whether the received indications correspond to antisurge mode activation conditions; and program code instructions for, in response to a determination that the received indications correspond to antisurge mode activation conditions, initiating control of selected engine components by directing the selected engine components to operate based on the stored engine operating parameters recorded a predetermined time prior to the determination.

17. The computer program product of claim 16, wherein determining whether the received indications correspond to antisurge mode activation conditions is performed based on a mapping of engine trouble operating points relative to engine load and engine revolutions per minute (RPM).

18. The computer program product of claim 16, wherein determining whether the received indications correspond to antisurge mode activation conditions is performed based on a change in engine accelerator pedal position from a position corresponding to a substantially open throttle position to a substantially closed throttle position.

19. The computer program product of claim 16, wherein program code instructions for initiating control of selected engine components include instructions for controlling a throttle position setpoint, an injection rate setpoint, an ignition angle setpoint and wastegate setposition.

20. The computer program product of claim 16, further comprising program code instructions for returning the selected engine components to a normal mode of operation in response to an indication of clearance of the antisurge mode activation conditions.

* * * * *